United States Patent
Kawai (10) Patent No.: US 7,511,756 B2
(45) Date of Patent: Mar. 31, 2009

(54) IMAGE-TAKING APPARATUS AND IMAGE PROCESSING METHOD

(75) Inventor: Takashi Kawai, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 11/069,258

(22) Filed: Mar. 1, 2005

(65) Prior Publication Data
US 2005/0196068 A1    Sep. 8, 2005

(30) Foreign Application Priority Data
Mar. 3, 2004    (JP) .............................. 2004-059845

(51) Int. Cl.
*H04N 5/225*    (2006.01)

(52) U.S. Cl. .................. 348/335; 348/208.99

(58) Field of Classification Search . 348/208.99–208.6, 348/335, 222.1
See application file for complete search history.

(56) References Cited

U.S. PATENT DOCUMENTS

| 5,185,667 | A | 2/1993 | Zimmermann |
| 6,574,376 | B1 | 6/2003 | Shiota et al. |
| 2003/0117675 | A1 | 6/2003 | Shirato et al. |

FOREIGN PATENT DOCUMENTS

| JP | 6-501585 A | 2/1994 |
| JP | 8-307753 A | 11/1996 |
| JP | 08307753 A | * 11/1996 |
| JP | 10-233950 A | 9/1998 |
| JP | 3126955 B2 | 11/2000 |
| JP | 2002-203237 A | 7/2002 |
| WO | 92/21208 | 11/1992 |
| WO | 98/27718 | 6/1998 |

* cited by examiner

*Primary Examiner*—Tuan V Ho
(74) *Attorney, Agent, or Firm*—Locke Lord Bissell & Liddell LLP (57) ABSTRACT

An image-taking apparatus is disclosed which transforms a fisheye image into a perspective projection image and allows appropriate correction of image fluctuations with a reduced load of operation. The image-taking apparatus has an image-pickup element which photoelectrically converts a fisheye image and a transforming section which performs projective transformation processing of fisheye image data obtained by using the image-pickup element into perspective projection image data. The image-taking apparatus has a vibration detecting section which obtains vibration information about vibrations. The transforming section shifts a transformation area which is subjected to projective transformation processing in the fisheye image data based on the vibration information.

7 Claims, 10 Drawing Sheets

IMAGE-TAKING APPARATUS AND IMAGE PROCESSING METHOD

BACKGROUND OF THE INVENTION

1. Field of the Invention

The present invention relates to an image-taking apparatus which employs an image-pickup element to take image information, and more particularly, to an image-taking apparatus which performs fluctuation correction processing on a taken fisheye image to output the resulting perspective projection image.

2. Description of Related Art

Conventionally, image-taking operation in a wide-angle field of view with fisheye optical system has been performed in variable areas such as monitoring, remote operation, video conference, and endoscopies. The fisheye optical systems are characterized in that even an image in a super wide-angle field of view at an angle of field of more than 180 degrees can be projected in a finite area on a light-receiving surface of the image-pickup element through a special projection method, in other words, it is possible to take an image in a super wide-angle field of view which cannot be taken theoretically by a general image-taking apparatus for taking a perspective projection image. In the projection method specific to the fisheye optical system, however, the shape of a taken image is distorted to the extent that it looks significantly different from the original shape of the object when viewed by a human.

As an approach to solve the problem, WO 92/21208 (corresponding to U.S. Pat. No. 5,185,667 and Japanese Patent Laid-Open No. H06 (1994)-501585) has proposed an apparatus which transforms a taken fisheye image into a perspective projection image and displays the transformed image on a display. In Japanese Patent Laid-Open No. H06 (1994)-501585, panning, tilting, rotation, and magnification are set for an arbitrary image area in a hemispherical field of view taken by a fisheye lens, and coordinate transformation is made by using two-dimensional transformation mapping, X-MAP and Y-MAP, thereby making it possible to observe an image of all directions.

Japanese Patent Laid-Open No. H10 (1998)-233950 (corresponding to WO 98/27718) has proposed electronic zooming which utilizes the distribution of the density of image information in an image taken by a fisheye optical system. Specifically, the image taken by the fisheye optical system has the characteristic that it is more highly compressed in a portion closer to its periphery and is more greatly enlarged in a portion closer to the center. The characteristic is used to perform the electronic zooming without reducing resolution.

In addition, Japanese Patent Laid-Open No. H8 (1996)-307753 has proposed an apparatus which can display data corresponding to part of an image in a wide-angle field of view taken by a fisheye lens without distortion in accordance with the movement of the head of a viewer. Specifically, Embodiment 3 described in Japanese Patent Laid-Open No. H8 (1996)-307753 involves transformation processing for displaying an image taken by the fisheye lens with an equidistant projection method in a planar shape without distortion and compensation processing for image fluctuations due to vibrations of the image-taking apparatus. The compensation processing is performed when the amount of pixel shifts associated with the image fluctuations is equal to or smaller than a predetermined number of pixels (for example, two pixels).

In the apparatus of Japanese Patent Laid-Open No. H06 (1994)-501585, a field of view and a magnification are designated from an input means, a transformation expression is solved by microcomputer, and a transformation table is set for a two-dimensional transformation map to provide the panning, tilting, rotation, and zooming functions in an arbitrary area. Since the transformation expression must be solved each time a slight change occurs in the field of view or magnification, the problem of a significant load of operation on a microcomputer is presented.

In the apparatus of Japanese Patent Laid-Open No. H10 (1998)-233950, an electronically zoomed image with less deterioration of resolution is provided by using the density distribution of image information in a fisheye image. However, as the zoom magnification is greater, image fluctuations are caused by vibrations applied to the apparatus such as camera shake to result in the problem of deterioration of the resolution.

The apparatus of Japanese Patent Laid-Open No. H08 (1996)-307753 performs control such that a comparison between the detected pixel shift amount and the predetermined pixel number is used as a reference for performing the compensation processing for image fluctuations. However, the pixel shift amount due to video fluctuations is determined by a relationship between the vibration amount applied to the apparatus and the zoom ratio and is not determined by a single threshold value. In addition, the determination whether image fluctuations are caused by camera shake or by an intentional movement of the field of view such as panning and tilting cannot be made on the basis of a fixed threshold value, and there are large image fluctuations due to unintentional violent vibrations or intentional slight image fluctuations for a slow movement of a viewpoint.

SUMMARY OF THE INVENTION

To solve the problems described above, it is an object of the present invention to provide an image-taking apparatus which transforms a fisheye image into a perspective projection image and allows appropriate correction of image fluctuations with a reduced load of operation.

To achieve the abovementioned object, according to an aspect, the present invention provides an image-taking apparatus. The image-taking apparatus has an image-pickup element which photoelectrically converts the fisheye image, a transforming section which performs projective transformation processing of fisheye image data obtained by using the image-pickup element into perspective projection image data, and a vibration detecting section which obtains vibration information about vibrations. The transforming section shifts a transformation area which is subjected to the projective transformation processing in the fisheye image data based on the vibration information.

These and other characteristics of the image-taking apparatus of the present invention will be apparent from the following description of specific embodiments with reference to the drawings.

DETAILED DESCRIPTION OF THE PREFERRED EMBODIMENTS

Preferred embodiments of the present invention are hereinafter described with reference to the drawings.

Embodiment 1

Figure 1:
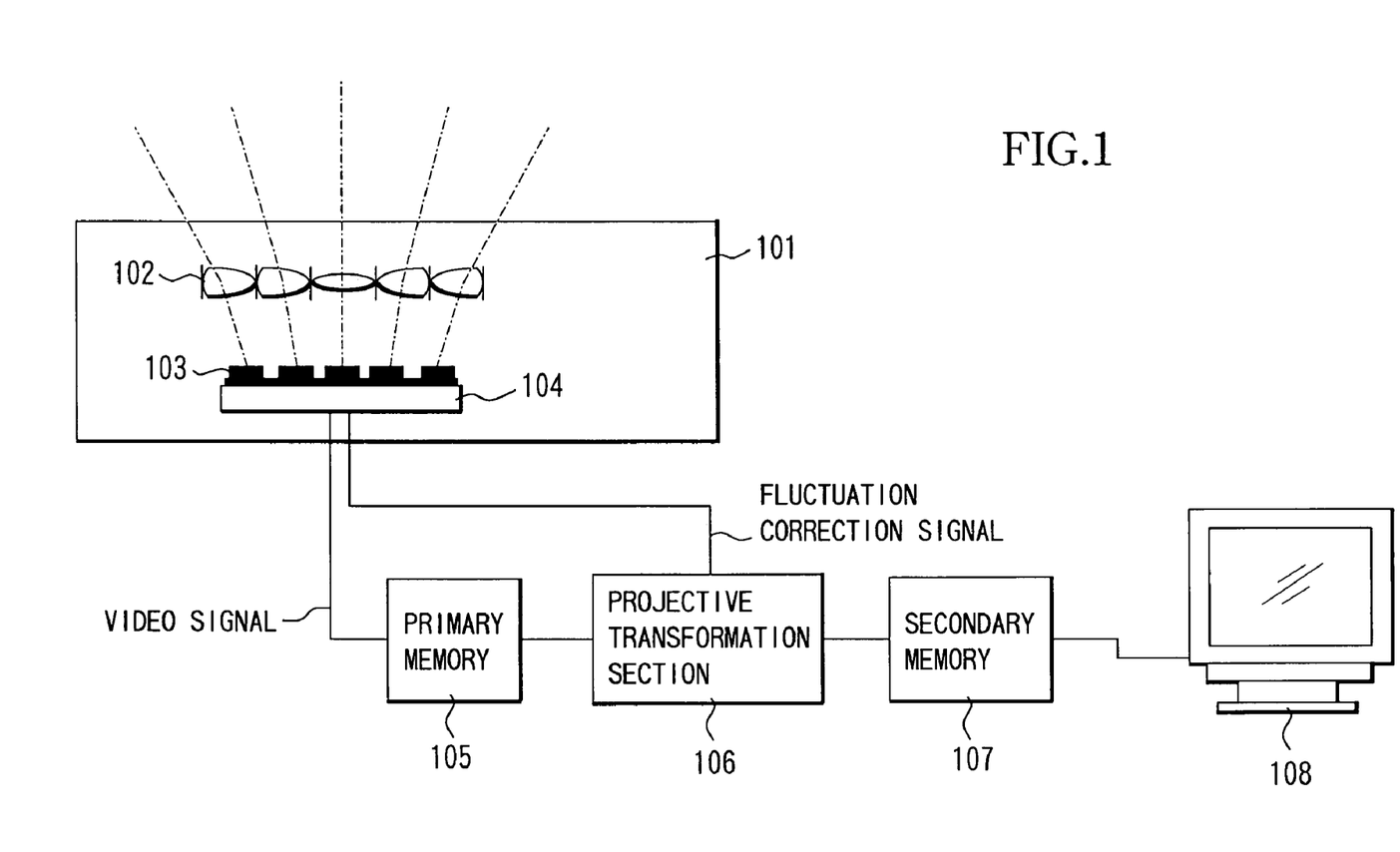
FIG. 1 is a block diagram showing the structure of an image-taking apparatus which is Embodiment 1 of the present invention.

FIG. 1 shows the structure of an image-taking apparatus which is Embodiment 1 of the present invention. Reference numeral 101 shows a compound eye image-taking apparatus which is formed of a compound eye optical unit 102, an image-pickup element 103, and an image processing circuit 104.

Reference numeral 102 shows the compound eye optical unit (a compound eye optical system) which has a plurality of lenses arranged in a matrix-like form in which each of the lenses has the function of forming a luminous flux (shown by dash dotted lines in FIG. 1) from an object, not shown, into an image. Reference numeral 103 shows the image-pickup element which photoelectrically converts an object image formed by each of the lenses of the compound eye optical unit 102. Reference numeral 104 shows the image processing circuit which processes the signals provided by the photoelectrical conversion in the image-pickup element 103 to produce a single continuous object image.

Figure 2A:
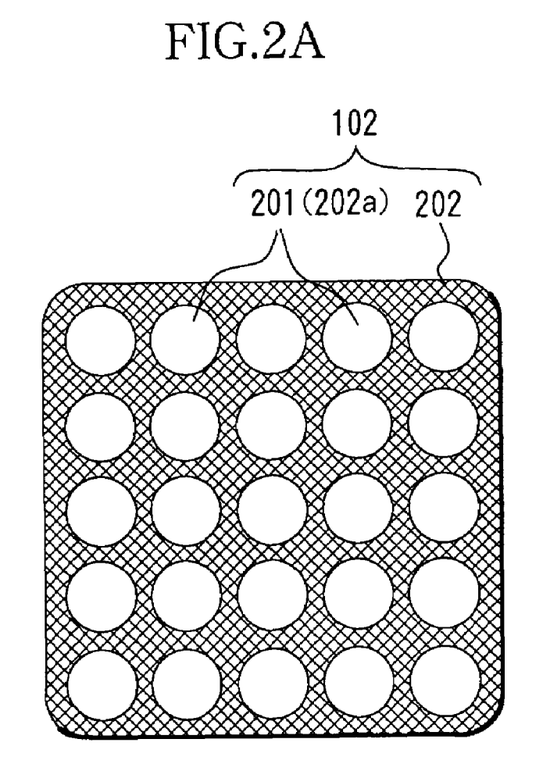
FIG. 2A shows a compound eye optical unit forming part of the image-taking apparatus of Embodiment 1 in the present invention viewed from the front side.
Figure 3:
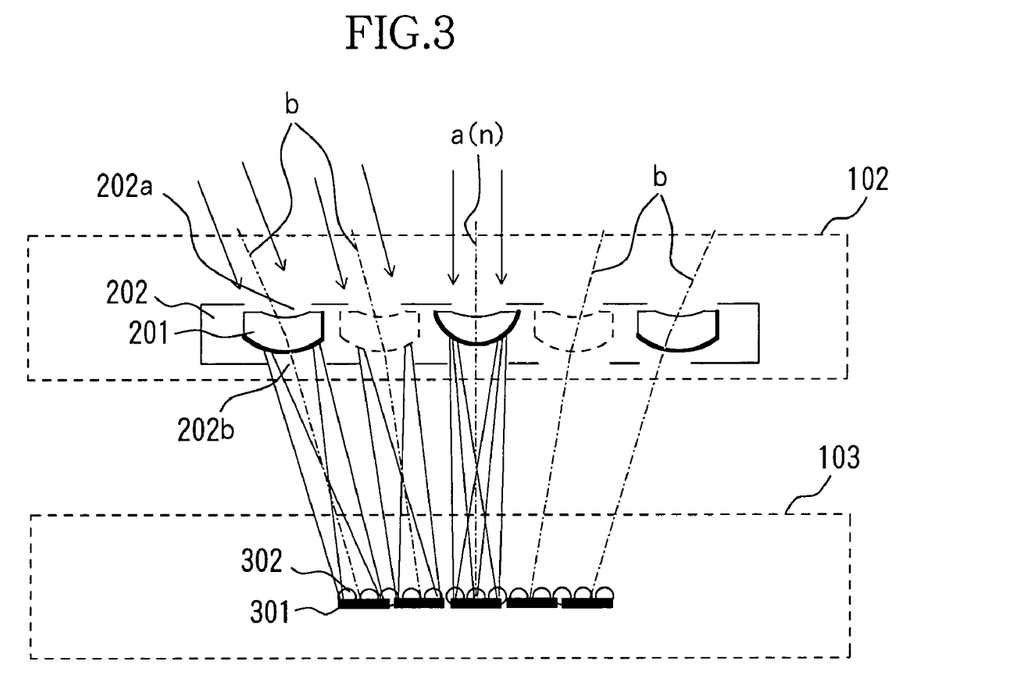
FIG. 3 is a cross section of the compound eye optical unit and the image-pickup element of the image-taking apparatus in Embodiment 1 of the present invention.

Detailed description is made for the compound eye optical unit 102 and the image-pickup element 103. FIG. 2A shows the surface of the compound eye optical unit 102 facing the object (on the front side). FIG. 3 is a section view of the compound eye optical unit 102 and the image-pickup element 103 viewed from the side.

The compound eye optical unit 102 has a generally flat shape and is formed of a plurality of single lenses 201 arranged in a matrix-like form (a total of 25 lenses with 5 rows and 5 columns in Embodiment 1) and a lens support member 202 made of plastic or the like and supporting the plurality of lenses 201. Openings 202a for passing luminous fluxes transmitted through the lenses 201 are formed in portions of the front surface (the upper surface in FIG. 3) of the lens support member 202 which support the respective lenses 201. Thus, the surrounding portions of the openings 202a in the lens support member 202 serve as stops.

As shown in FIG. 3, the direction of principal rays "a" (shown by a dash dotted line in FIG. 3) on the incident side of the lens 201 disposed in the center of the compound eye optical unit 102 is coincident with a normal direction "n" to the compound eye optical unit 102. At a lens 201 disposed at a larger distance from the center, principal rays "b" on the incident side inclines at a larger angle with respect to the normal "n" (the principal rays "a" incident on the central lens 201) such that the principal rays "b" extend outward significantly.

The central lens 201 is formed to have the principal rays "a" on the incident side coincident with the principal rays on the emerging side. Thus, the principal rays on the emerging side of the central lens 201 are perpendicular to the image-pickup element 103 disposed in parallel with the compound eye optical unit 102.

On the other hand, an outer lens 201 away from the center is formed such that the principal rays b on the incident side are refracted to cause the principal rays on the emerging side to extend in a direction close to the perpendicular to the image-pickup element 103. This can provide a wide-angle field of view (a wide angle of view for taking images) while the compound eye optical unit 102 is compact in size.

Openings 202b are formed in portions of the rear surface (the lower surface in FIG. 3) of the lens support member 202 through which luminous fluxes transmitted through the respective lenses 201 pass. The opening 202b associated with the aforementioned central lens 201 is formed to face the rear surface of the central lens 201. However, openings 202b associated with the outer lenses 201 are disposed at inner positions closer to the center with respect to the positions facing those lenses 201 in accordance with the inclinations of the optical axes on the emerging side (the inclinations after the refraction) of the lenses 201.

Figure 2B:
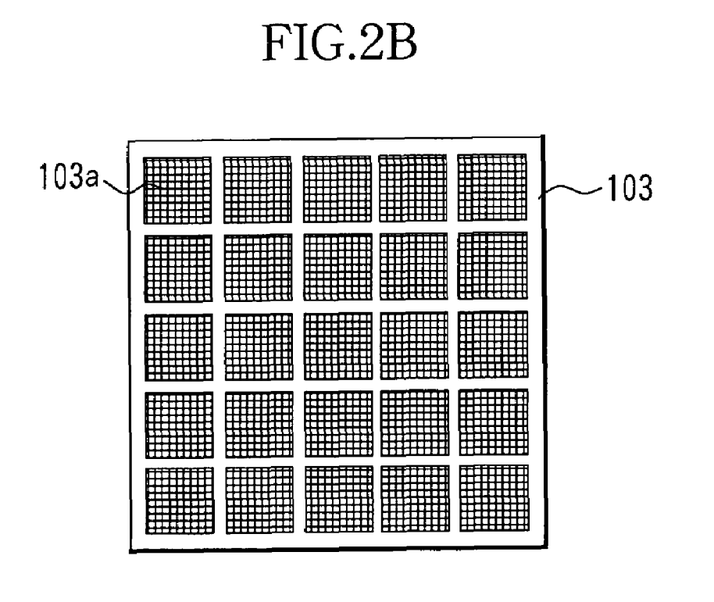
FIG. 2B shows an image-pickup element in the image-taking apparatus.

The image-pickup element 103 consists of a photoelectrical conversion element 301 which is formed of a CCD sensor or a CMOS sensor and microlenses 302 which converge light to respective pixels of the photoelectrical conversion element 301. As shown in FIG. 2B, photoelectrical conversion areas 103a are formed on the photoelectrical conversion element 301, in which the number of the areas 103a is the same as the number of the single lenses 201 (25 in Embodiment 1). One photoelectrical conversion area 103a photoelectrically converts an object image formed by the associated one single lens 201. In other words, an object image over the entire field of view of the compound eye optical unit 201 is taken in separate parts by a plurality of image-taking systems each formed of one lens 201 and one photoelectrical conversion area 103a.

A luminous flux from the object shown by each arrow in FIG. 3 passes through respective openings 202a, 202b of the lens support member 202 and each lens 201, is condensed by each microlens 302, and is formed into an image on a light-receiving surface (pixel) of each photoelectrical conversion area 103a in the photoelectrical conversion element 301. Since the single lenses 201 have their optical axes inclined with respect to each other and form the images of individual portions of the field of view on the light-receiving surface of the photoelectrical conversion element 301, the entire field of view can be imaged without any gap left.

The image processing circuit 104 is formed integrally with the image-pickup element 103 and, for each pixel, performs image processing on the signal output by the image-pickup element 103 after the photoelectrical conversion.

Figure 4:
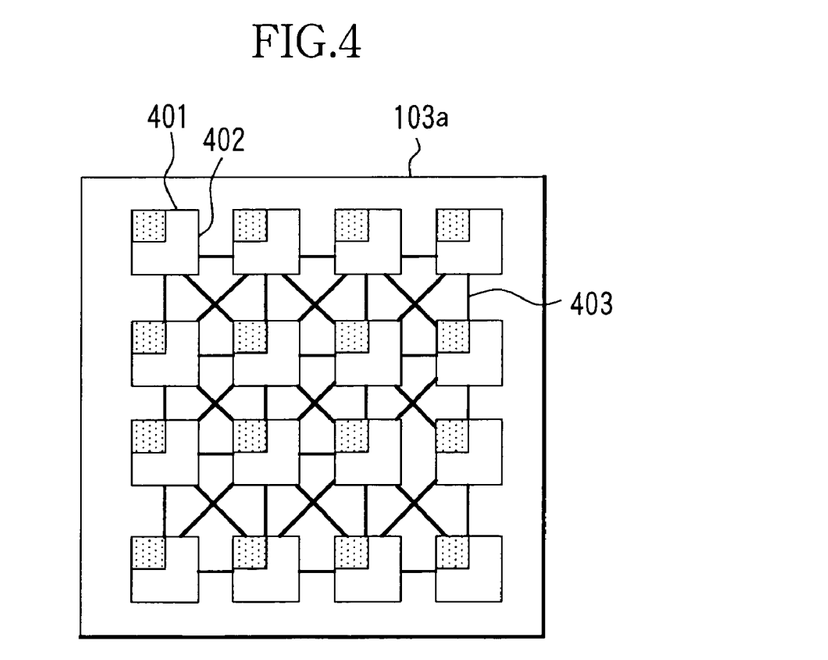
FIG. 4 shows the structure of the image-pickup element of the image-taking apparatus in Embodiment 1 of the present invention.

FIG. 4 shows the structure of one photoelectrical conversion area 103a in the image-pickup element 103. The image processing circuit 104 is provided in the photoelectrical conversion area 103a.

Reference numeral 401 shows a photoelectrical conversion section which constitutes a pixel for receiving a luminous flux from the object. The photoelectrical conversion section 401 receives a luminous flux from the object and converts it into an electric signal. Reference numeral 402 shows an operation section provided for each pixel. The operation section 402 includes a memory and a logic operation circuit and converts the electric signal from the photoelectrical conversion section 401 into a video signal for each pixel. The operation sections for respective pixels are connected to each other through a communicating line 403. This enables correlation operation between video signals from close pixels and allows information about vibrations of the apparatus to be extracted from the video signal, as later described.

Description is now made for specifications required of the compound eye optical unit 102. The image-taking apparatus is a smaller image-taking apparatus than a normal video camera and is made to substitute for the eyes of a person (a user) who carries the apparatus. Specifically, the image-taking apparatus is expected to be put on the clothing or the like of a child or an elderly person and used when a lost child or a wandering elderly person is searched for, or when a visually handicapped person is supported in walking. In such a use, it is more important to allow instant understanding of the environment over a wide area surrounding the carrier than to observe part of the environment surrounding the carrier in detail. It is necessary to at least take an image of the visual field which can be normally recognized by both eyes of a human from the front of the carrier.

Generally, it is said that the visual field of both eyes of a human is equal to 60 degrees in the vertical direction and 120 to 160 degrees in the horizontal direction. Thus, the number and the optical axis inclinations of the lenses 201 arranged in the compound eye optical unit 102 are determined to enable image-taking at a wide angle of view of at least 120 to 160 degrees in the horizontal direction.

On the other hand, it is well known that the entire visual field of a human does not have the uniform resolution. Specifically, we place a subject which we want to observe deliberately at the center of the visual field and view it at high resolution, while in peripheral portions of the visual field, we recognize the presence of an object but we view it at resolution which is not very high. For this reason, in the image-taking apparatus of Embodiment 1, the compound eye optical unit 102 forms a fisheye image which is taken as an image. The fisheye image is an image with a wide field of view and has the characteristic that the resolution is higher at the center of the field of view and is lower at a larger angle with respect to the center.

The video signal of the fisheye image taken by using the compound eye optical unit 102 described above is stored in a primary memory 105 shown in FIG. 1.

Figure 5A:
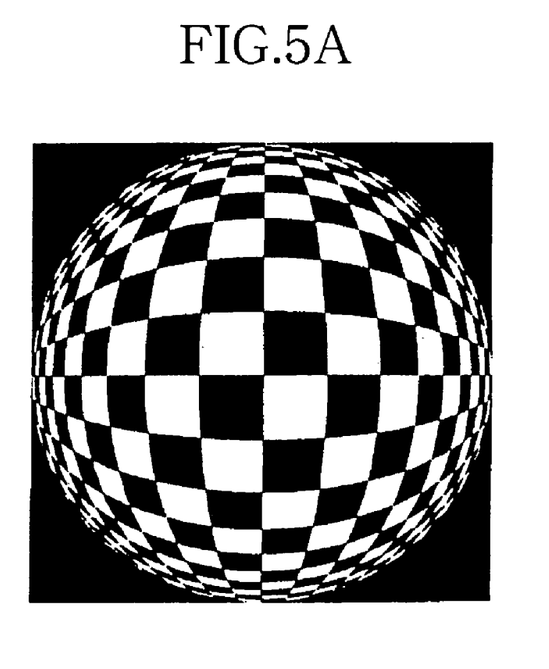
FIG. 5A shows a fisheye image of an object in a grid form in Embodiment 1 of the present invention.

FIG. 5A shows an example of the fisheye image taken by using the compound eye optical unit 102. The fisheye image is provided by taking a planar object in a grid form in a projection method through orthographic projection (sine projection method) and has distortion in accordance with a distance from the center of the image as expressed by $y=f \cdot \sin \theta$, where y represents the distance from the center of an optical axis, f a focal length, and $\theta$ an incident angle.

It should be noted that the fisheye image expressed by $y=f \cdot \sin \theta$ is taken in Embodiment 1, but alternatively, a fisheye image expressed by $y=f \cdot \theta$ provided in an equidistant projection method may be transformed into a perspective projection image.

Figure 5B:
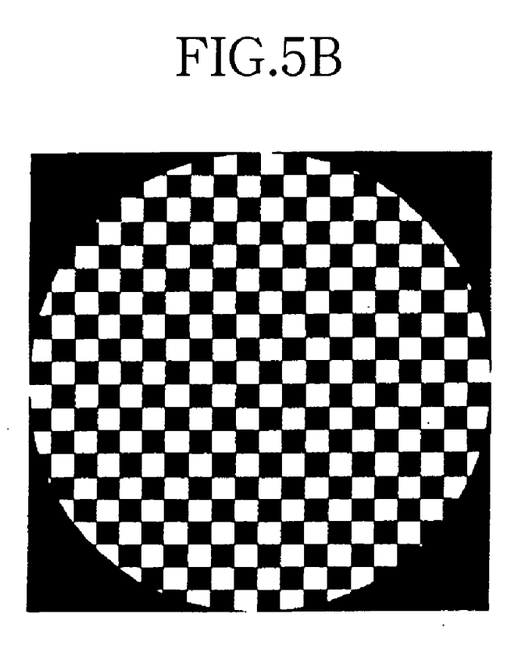
FIG. 5B shows a perspective projection image of the fisheye image in FIG. 5A.

The fisheye image data stored in the primary memory 105 is transformed into a perspective projection image by a projective transformation section 106. FIG. 5B shows the perspective projection image resulting from the projective transformation of the fisheye image, in which the original grid form of the object is restored. The perspective projection image is actually transformed into an image of a rectangular area for display on a video display section 108.

The projective transformation section 106 is now described. As described above, the fisheye image is taken with the orthographic projection method in Embodiment 1. In this case, a luminous flux from the object received at an incident angle $\theta$ is formed into an image expressed by $y=f \cdot \sin \theta$ on an image-pickup surface of the image-pickup element 103.

On the other hand, in the perspective projection image, a luminous flux from the object received at an incident angle $\theta$ is formed into an image expressed by $Y=F \cdot \tan \theta$ (where Y represents a distance from the center of an optical axis, F a focal length, and $\theta$ an incident angle) on the image-pickup surface. Thus, the transformation expression for transforming the fisheye image into the perspective projection image is expressed by $y=f \cdot \sin \{\tan^{-1} (Y/F)\}$.

Conventionally, variable transformation methods have been proposed. For example, Japanese Patent No. 3126955 has shown the use of hardware using a lookup table to realize the abovementioned transformation expression with a simple structure. In addition, Japanese Patent Laid-Open No. 2002-203237 has shown a method of calculating a projection point with geometry operation to transform a curved image into a planar image in order to avoid complicated calculations for each pixel. In Embodiment 1, the abovementioned transformation expression may be used, or any other method may be used.

Figure 6A:
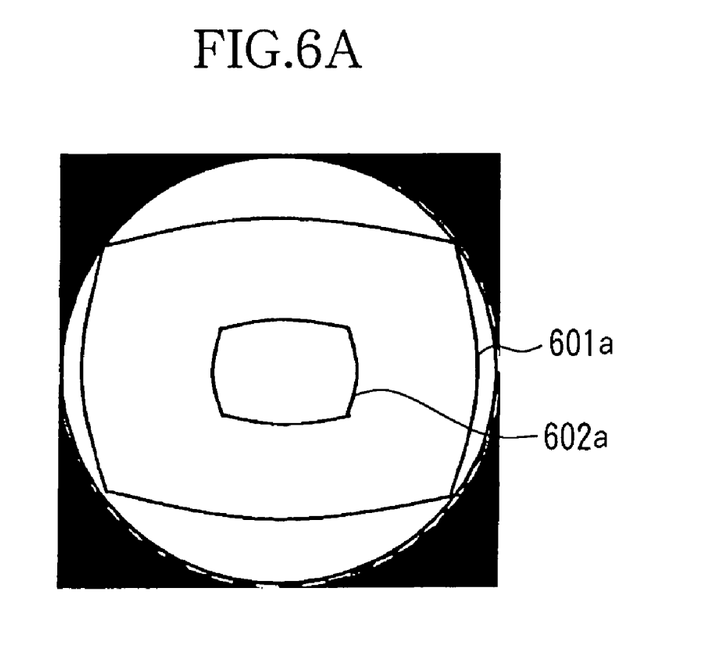
FIGS. 6A to 6C show transformation processing of a fisheye image into a perspective projection image in Embodiment 1 of the present invention to explain zoom processing.
Figure 6B:
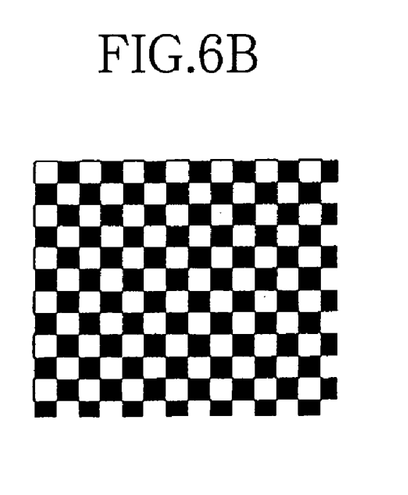
Figure 6C:
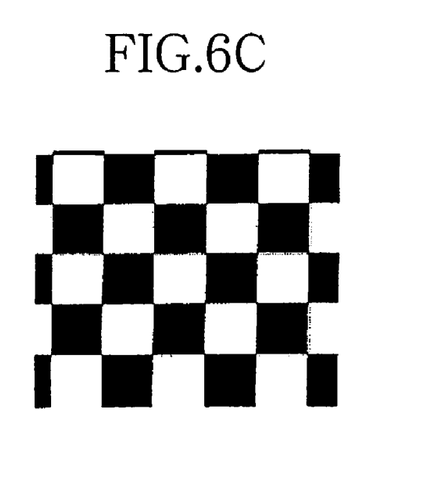

A magnified image can be provided by using f as a parameter in the projective transformation. FIG. 6A shows a fisheye image, and FIGS. 6B and 6C show perspective projection images which are formed by projective transformation of the fisheye image in FIG. 6A and displayed on the video display section 108. However, the perspective projection image in FIG. 6B is provided by projective transformation of an area 601a in the field of view of the fisheye image shown in FIG. 6A to match the window size of the video display section 108. On the other hand, the perspective projection image in FIG. 6C is formed by projective transformation with the parameter "f" multiplied by "n" as compared with the case in FIG. 6B. In this case, an area 602a in the field of view of the fisheye image in FIG. 6A can be subjected to the projective transformation to provide the image magnified "n" times as shown in FIG. 6C.

As described above, the fisheye image is transformed into the perspective projection image by the projective transformation section 106 and displayed on the video display section 108.

On the other hand, the image processing circuit 104 uses the fisheye video signal to produce motion vectors as vibration information which represents the vibrations of the image-taking apparatus. As shown in FIG. 4, Embodiment 1 has the operation section 402 for each of the photoelectrical conversion sections 401. Since the image-pickup element 103 integral with the image processing circuit 104 described above enables image processing without requiring the process of transmitting the video signal provided by the photoelectrical conversion to an external image processing circuit, fast operation processing can be achieved.

In Embodiment 1, images are taken at a high frame rate which is several times faster (for example, 300 frames/sec, approximately ten times faster than normal) than a normal video frame rate (30 frames/sec) to realize fast operation.

The operation section 402 has a memory for temporarily storing the video signal and detects (produces) motion vectors with a template matching method between video signals of two consecutive frames. Fast reading and operation can reduce the movement amount between frames relative to the movement of the image-taking apparatus to result in the advantage that the search range for the template matching can be reduced.

In addition, more efficient searching can be performed by sequentially shifting the range of the template matching in the fisheye image from peripheral portions to the center in the field of view.

Figure 7A:
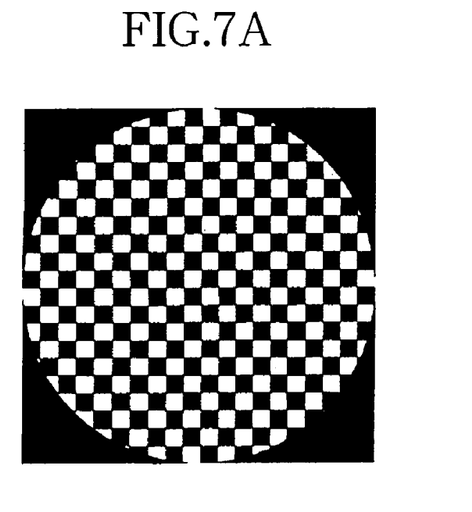
FIGS. 7A to 7D are schematic diagrams showing a perspective projection image, a fisheye image, and motion vectors of them in Embodiment 1 of the present invention.
Figure 7B:
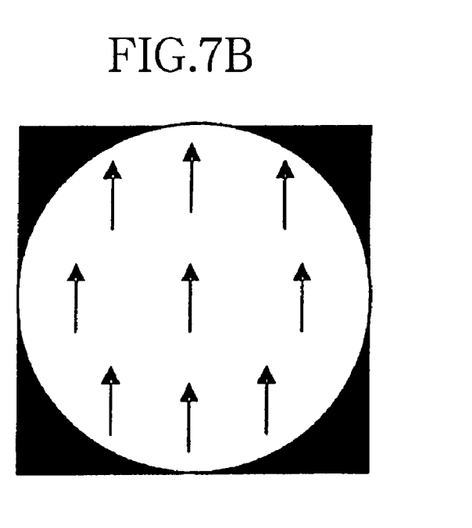
Figure 7C:
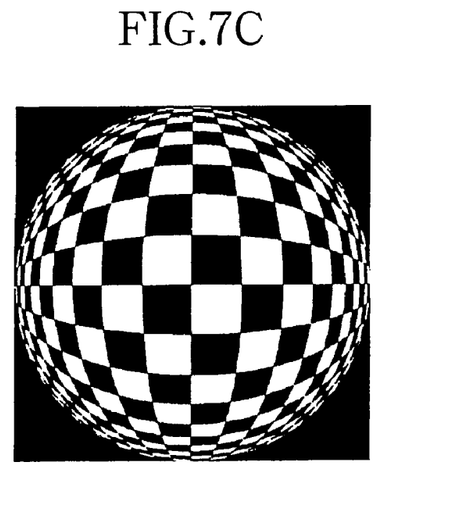

The detection of the motion vectors is briefly described with reference to FIG. 7. FIGS. 7A and 7C show a perspective projection image after projective transformation and a fisheye image taken by the image-pickup element 103, respectively. When the image-taking apparatus is moved upward, the motion vectors of the perspective projection image are the same over the entire area as shown in FIG. 7B. It should be noted that the direction of each arrow represents the direction of the movement (vibration), while the length of each arrows represents the amount of the movement (vibration amount). If the resolution is uniform over the entire field of view, the search range for producing motion vectors through the template matching is larger as the vibration amount is greater.

Figure 7D:
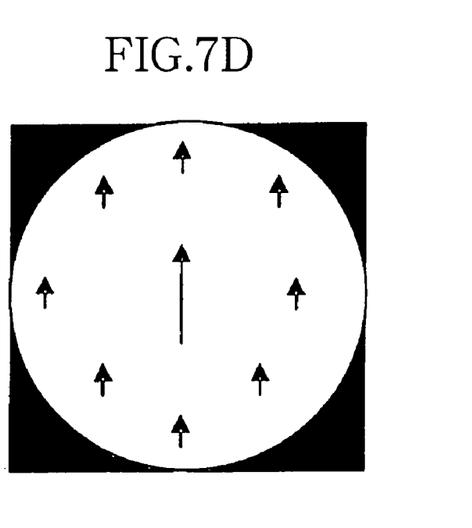

On the other hand, if the resolution is lower in a portion closer to the periphery away from the center as in the fisheye image, motion vectors are shorter in the peripheral portions and larger at the center as shown in FIG. 7D. Thus, the motion vectors can be efficiently detected by making a search beginning with the peripheral portions of the video with a smaller search range at first and then a larger search range as the search range approaches the center.

In addition, since a larger motion vector can be provided in the center than in peripheral portions even from the same image fluctuations, movements at high frequency can be advantageously detected in the center. It is thus possible to detect low-frequency components of movements (vibrations) in peripheral portions of the field of view and detect high-frequency components in the center of the field of view.

After the motion vectors are detected in this manner, a fluctuation correction amount in accordance with the motion vector, that is, a shift amount of a transformation area to be subjected to projective transformation is transmitted to the projective transformation section 106.

Figure 8:
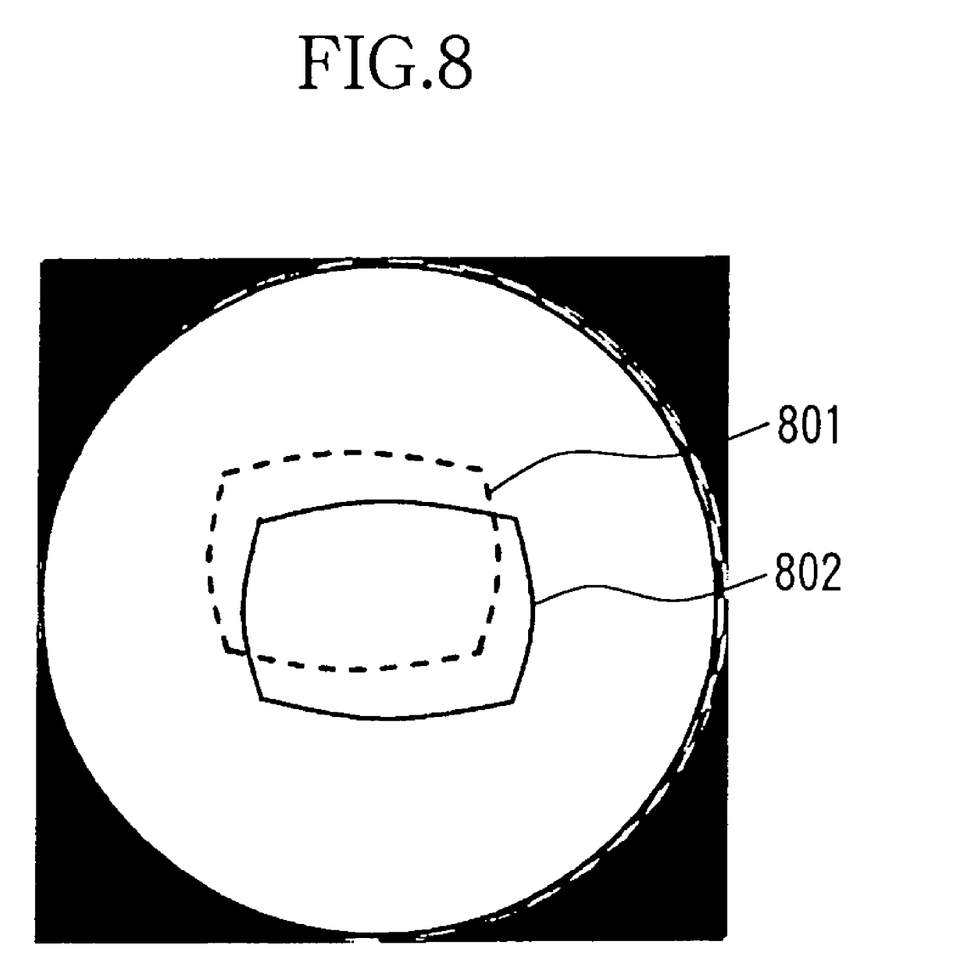
FIG. 8 shows a projection transformation area when fluctuations are corrected in the image-taking apparatus of Embodiment 1 of the present invention.

Upon reception of the fluctuation correction amount, the projective transformation section 106 shifts a transformation area 801 from a reference transformation area 802 in accordance with the fluctuation correction amount as shown in FIG. 8 and performs projective transformation of the fisheye image data within the shifted transformation area 801.

Figure 9:
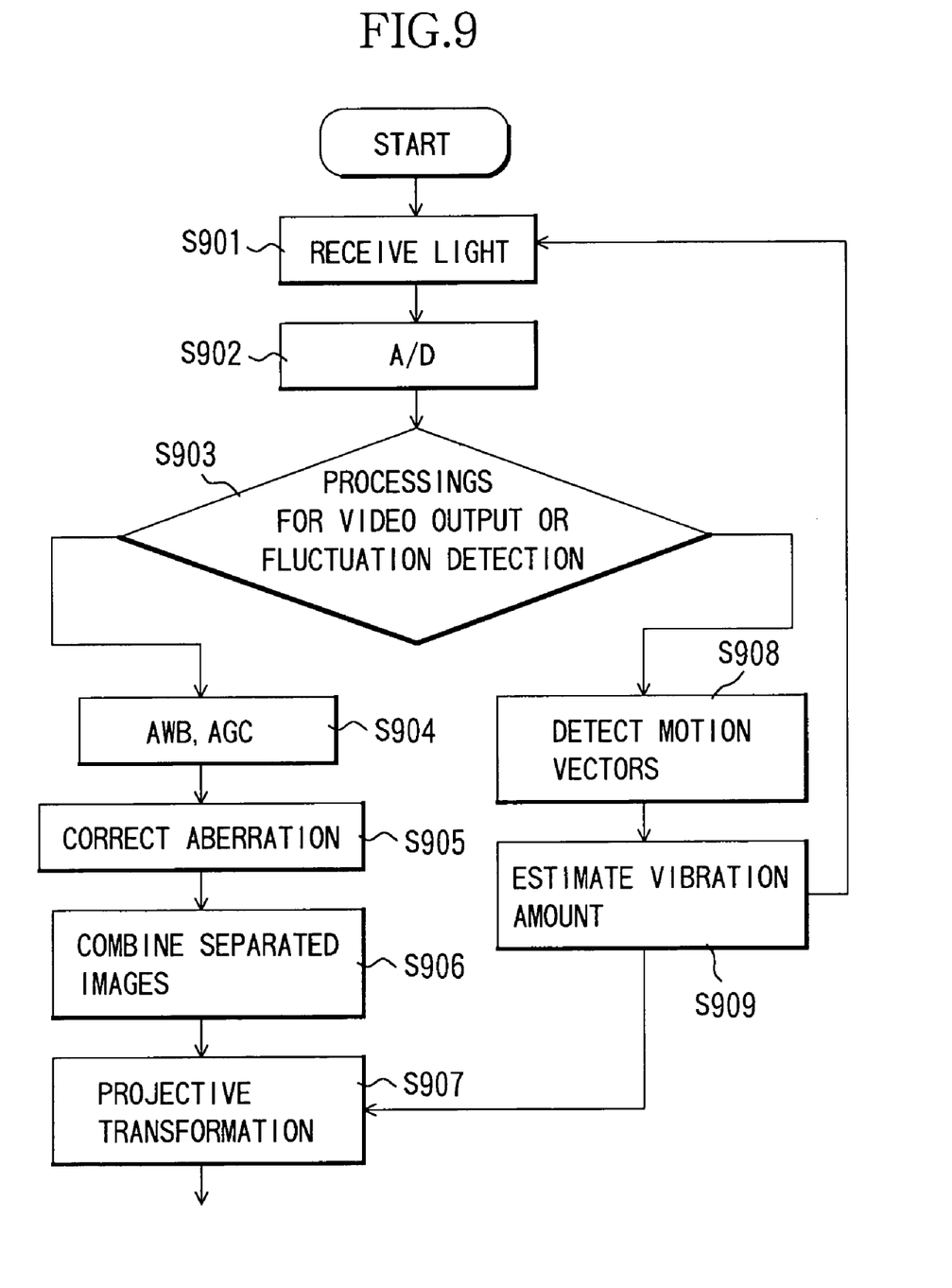
FIG. 9 is a flow chart showing the operation of the image-taking apparatus in Embodiment 1 of the present invention.

Next, the operation of the image-taking apparatus in Embodiment 1 is described with reference to a flow chart shown in FIG. 9. The operation is performed in the image processing circuit 104 and the projective transformation section 106. While the operation through hardware is herein described, similar operation can be performed with an image processing program stored in a CPU.

First, at step 901, an object image received is photoelectrically converted by the image-pickup element 103 (the photoelectrical conversion section 401 in each photoelectrical conversion area 103a). Next, at step 902, the electric signal resulting from the photoelectrical conversion of the image-pickup element 103 is converted into a digital signal by the image processing circuit 104 (the operation section 402) to produce a video signal as fisheye video.

Then, at step 903, selection is made between processing for video output and processing for fluctuation detection on the digital video signal. When the processing for fluctuation detection is performed, the flow proceeds to step 908 where the operation section 402 detects motion vectors by using the video signal. The motion vectors may be set such that a single motion vector or a plurality of motion vectors are produced for each photoelectrical conversion area in which an image is formed by each single lens 201 of the compound eye optical unit 102. The production of the single or plurality of motion vectors for each single lens 201 leads to a plurality of motion vectors produced over the entire field of view.

At step 909, processing of estimating the vibration amount of the image-taking apparatus from the motion vectors is performed. As described above, since the frame rate in the image-taking apparatus is higher than the normal video frame rate (30 frames/sec), the vibration amount can be estimated by using a plurality of frames.

For example, if a frame rate is set to 300 frames/sec in the image-taking apparatus, the vibration amount can be detected with one third of that frame rate, that is, 100 frames, and a signal for video can be produced with the remaining 200 frames. In this case, the processing of light receiving (step 901), the processing of detection of motion vectors (step 908), and the processing of estimation of a vibration amount (step 909) are repeated until the estimation of a vibration amount (step 909) consumes 100 frames.

It is also possible that a variable which represents the probability of the vibration amount estimation is provided and the abovementioned operation is repeated until the probability exceeds a threshold value.

After the vibration amount is estimated as described above, the estimated vibration amount is output to the projective transformation section 106 as a fluctuation correction amount (a shift amount of the transformation area). The shift amount is greater as the vibration amount is larger and the shift amount is smaller as the vibration amount is smaller. Thereafter, the fisheye video signal digitized at step 902 is subjected to the processing for video output. The flow proceeds to step 904 from step 903.

At step 904, auto white balance (AWB) and auto gain correction (AGC) are performed on the fisheye video signal. At step 905, aberration caused by each single lens 201 of the compound eye optical unit 102 is corrected. Then, at step 906, images taken separately in the plurality of image-taking areas (the photoelectrical conversion areas 103a) are combined into a single continuous fisheye image. The fisheye image is stored in the primary memory 105.

The data in the transformation area shifted in step 909 of the combined fisheye image data is subjected to projective transformation into a perspective projection image at step 907. The perspective projection image data in the transformation area is stored in a secondary memory 107 shown in FIG. 1 and then output to the video display section 108. The perspective projection image displayed on the video display section 108 is an image provided after its fluctuations are appropriately corrected.

As described above, according to Embodiment 1, the area (transformation area) for projective transformation into a perspective projection image from a fisheye image is shifted on the basis of information about vibrations of the image-taking apparatus provided from fisheye image data. Thus, the load of the operation is reduced and excellent electronic vibration isolation can be achieved at the same time as compared with the case where a fisheye image over the entire field of view is subjected to projective transformation at all times and a reading area is shifted in accordance with vibration information from the perspective projection image after the projective transformation.

Embodiment 2

Figure 10:
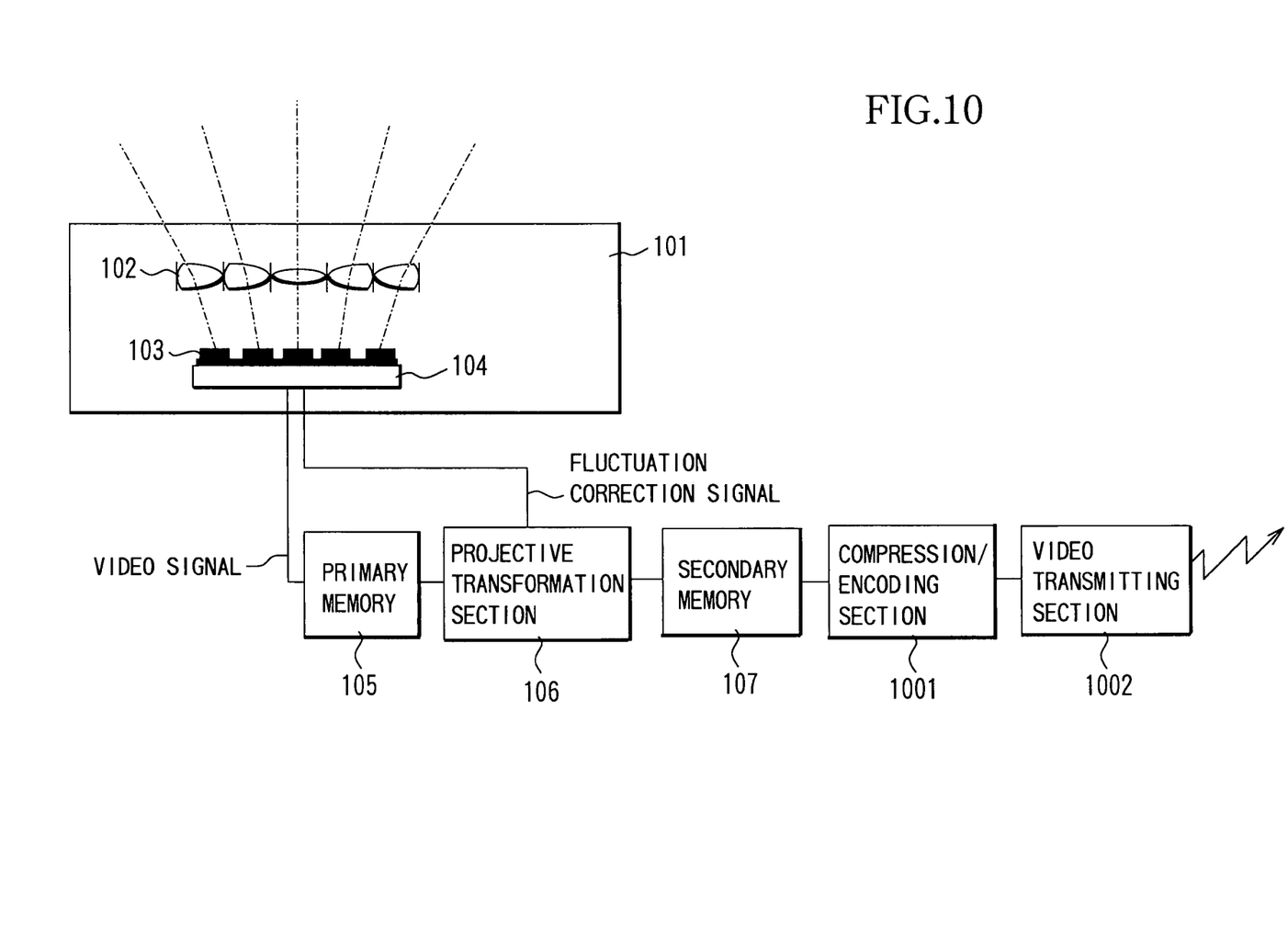
FIG. 10 is a block diagram showing the structure of an image-taking apparatus which is Embodiment 2 of the present invention.

FIG. 10 shows the structure of an image-taking apparatus which is Embodiment 2 of the present invention. The image-taking apparatus in Embodiment 2 differs from the image-taking apparatus in Embodiment 1 in that a compression/encoding section 1001 and a video transmitting section 1002 are added for transmitting a taken image to perform monitoring at a remote location.

The compression/encoding section 1001 performs compression processing and encoding processing of image data (perspective projection image data) output from a secondary memory 107. Variable methods of the compression/encoding of image data (video signal) exist at present, and no particular limitations are imposed on the method in Embodiment 2. However, it is desirable to employ a method in which higher compression and encoding is performed with the image quality maintained to enable video transmission at a low bit rate. Such compression/encoding methods include representative methods as international standards such as MPEG-4 and H263 as a compression/encoding method for moving images, and Motion JPEG and Motion JPEG 2000 as a compression/encoding method for still images. Embodiment 2 may employ any of them or another unique compression/encoding method.

The video transmitting section 1002 wirelessly transmits the compressed and encoded image data for remote monitoring.

In addition, the transmission method used in the transmission system is not particularly limited, but it is desirable to select a transmission method appropriate for the transmission range such as a wireless communication method using Wireless LAN or IMT-2000.

Since the image-taking apparatus of Embodiment 2 is carried by a human, Embodiment 2 is described with Bluetooth taken as an example due to its characteristic of power saving.

Bluetooth achieves communication through frequency hopping spread spectrum communication at a radio frequency of 2.4 GHz, basically follows primary modulation, spread modulation, transmission, reception, despread, and information demodulation which are performed in the spread spectrum, and employs GFSK in the primary modulation and the frequency hopping method in the spread modulation.

Since Bluetooth has the characteristic of power saving as described above, it causes less battery drain and thus realizes an effective method for a portable device.

In recent years, the standardization of "WiMedia" has been promoted as a short-distance radio video transmission method. WiMedia is intended for video transmission in a wireless personal area network (WPAN) approximately in the range of 1 to 50 meters and is effective for the video transmission method of Embodiment 2.

While each of Embodiments 1 and 2 has been described for the image-taking apparatus which forms a fisheye image with the compound eye optical system having the plurality of lens elements arranged therein, the present invention is applicable to an image-taking apparatus including an optical system which has a single fisheye lens disposed closer to an object to form a fisheye image. Such an example is hereinafter described.

Embodiment 3

Figure 11:
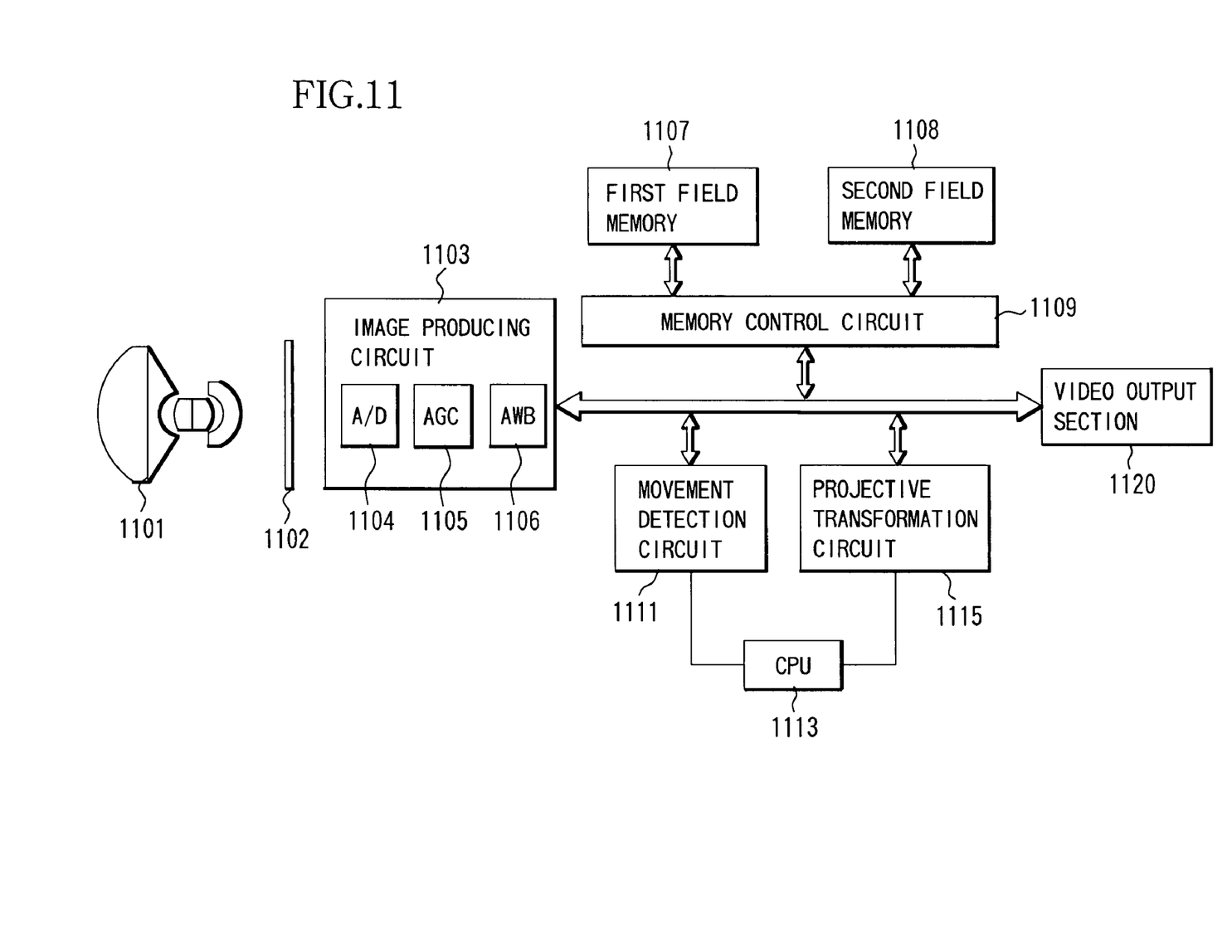
FIG. 11 is a block diagram showing the structure of an image-taking apparatus which is Embodiment 3 of the present invention.

FIG. 11 shows the structure of an image-taking apparatus which is Embodiment 3 of the present invention. The image-taking apparatus of Embodiment 3 has the size similar to that of a normal video camera and has a fisheye lens.

In FIG. 11, reference numeral 1101 shows a fisheye optical system which forms a fisheye image of an object, and 1102 an image-pickup element (a photoelectrical conversion element) formed of a CCD sensor or a CMOS sensor.

Reference numeral 1103 shows an image producing circuit which processes an electric signal output from the image-pickup element 1102 to produce a video signal (a fisheye video signal).

The image producing circuit 1103 has an A/D conversion circuit 1104 which converts an analog signal into a digital signal, an auto gain control circuit (AGC) 1105 which corrects the level of the digital signal, an auto white balance circuit (AWB) 1106 which corrects the white level of the video, and another image processing circuit, not shown, and produces digital fisheye video data as the abovementioned video signal through the processing in these circuits.

Reference numerals 1107 and 1108 show a first field memory and a second field memory, respectively, which temporarily store one or a plurality of screenfuls of video signal. The first field memory 1007 stores the video signal produced by the image producing circuit 1103. The second field memory 1108 stores a video signal after processing of distortion correction of fisheye video (projective transformation processing), later described.

Reference numeral 1109 shows a memory control circuit which controls the video signals input from or output to the first and second field memories 1107, 1108. Reference numeral 1111 shows a movement detection circuit which detects the movements (vibrations) of the image-taking apparatus from video signals of adjacent video fields.

The result of the detection by the movement detection circuit 111 is transmitted to a projective transformation circuit 1115, later described.

The projective transformation circuit 1115 performs projective transformation of the fisheye image data stored in the first field memory 1107 into perspective projection image data. The projective transformation circuit 1115 also corrects video fluctuations caused by the vibrations of the image-taking apparatus, as later described.

A video output section 1120 sequentially outputs and displays the perspective projection image data after the fluctuation correction onto a display device, not shown, or outputs and records the data onto a recording medium such as a semiconductor memory, a magnetic disc, an optical disc, and the like. Reference numeral 1113 shows a CPU as a controller which is responsible for the control of the image-taking apparatus, data transmission and the like.

In the image-taking apparatus of Embodiment 3, a formed object image is photoelectrically converted by the image-pickup element 1102 which in turn outputs an analog video signal in accordance with the object luminance to the image producing circuit 1103. In the image producing circuit 1103, the analog video signal is converted into, for example, a 14-bit digital signal by the A/D conversion circuit 1104. In addition, the auto gain control circuit (AGC) 1105 and the auto white balance circuit (AWB) 1106 correct the signal level and white level, respectively, to provide fisheye image data as a video signal after the correction. The fisheye image data is sequentially and temporarily stored in the first field memory 1107.

The fisheye image data of one field stored in the first field memory 1107 is input to the movement detection circuit 1111 together with the fisheye image data of the field subsequent thereto. Simultaneously, the fisheye image data of the older field in the first field memory 1107 is rewritten and updated with the fisheye image data of the current field. The abovementioned operation is controlled by the memory control circuit 1109.

The movement detection circuit 1111 determines a motion vector in each of a plurality of areas in each of the fisheye image data of the two consecutive fields with the template matching method. However, the motion vector can be determined with another method such as a gradient method without being limited to the template matching.

Then, the movement detection circuit 1111 integrates the detected motion vectors in the abovementioned plurality of areas to produce a motion vector as vibration information corresponding to the vibrations of the image-taking apparatus. The motion vector is transmitted to the projective transformation circuit 1115.

The projective transformation circuit 1115 calculates a shift amount of a transformation area as a fluctuation correction amount from the motion vector. The projective transformation circuit 1115 then shifts the area (transformation area) for transformation into perspective projection image data in the fisheye image data stored in the first field memory 1107 in a manner described with FIG. 8 in Embodiment 1 described above. In addition, the projective transformation circuit 1115 performs the projective transformation in the shifted transformation area and outputs the result to the video output section 1120 through the second field memory 1108. In this manner, the video fluctuations are favorably corrected while the load of operation is reduced.

It should be noted that each operation described above can be performed by an image processing program as a computer program in Embodiment 3, similarly to Embodiments 1 and 2.

While each of Embodiments 1 to 3 has been described for the case where the fisheye image data is used to provide the information about the vibrations applied to the image-taking apparatus, information about vibrations may be provided by using a sensor such as a vibration gyro.

In addition, the present invention is applicable not only to an image-taking apparatus which has an integral optical system for forming fisheye images, but also to an image-taking apparatus on which an optical system is removably mounted.

While preferred embodiments have been described, it is to be understood that modification and variation of the present invention may be made without departing from the scope of the following claims.

"This application claims priority from Japanese Patent Application No. 2004-59845 filed on Mar. 3, 2004, which is hereby incorporated by reference herein."

What is claimed is:

1. An image-taking apparatus capable of taking a fisheye image, comprising:
   an image-pickup element which photoelectrically converts the fisheye image;
   a transforming section which performs projective transformation processing of fisheye image data obtained by using the image-pickup element into perspective projection image data; and
   a vibration detecting section which obtains vibration information about vibrations applied to the image-taking apparatus,
   wherein the transforming section shifts a transformation area which is subjected to the projective transformation processing in the fisheye image data based on the vibration information obtained at the vibration detecting section, and the vibration detecting section is integrated with the image-pickup element.

2. The image-taking apparatus according to claim 1, wherein the transforming section shifts the transformation area by a larger amount as vibrations represented by the vibration information are larger.

3. The image-taking apparatus according to claim 1, wherein the vibration detecting section obtains the vibration information by using the fisheye image data.

4. The image-taking apparatus according to claim 1, further comprising a compound eye optical system which includes a plurality of optical units forming the fisheye image on a plurality of image-pickup areas of the image-pickup element.

5. A method of image processing in an image-taking apparatus capable of taking a fisheye image, comprising:
   a transformation step, by a transforming section, of performing projective transformation processing of fisheye image data into perspective projection image data; and
   a vibration detection step, by a vibration detecting section, of obtaining vibration information about vibrations applied to the image-taking apparatus based on the fisheye image obtained from an image-pickup element which photoelectrically converts the fisheye image,
   wherein a transformation area which is subjected to the projective transformation processing in the fisheye image data is shifted on the basis of the vibration information obtained at the vibration detection step in the transformation step, and the vibration detecting section is integrated with the image-pickup element.

6. The method of image processing according to claim 5, wherein the transformation area is shifted by a larger amount as vibrations represented by the vibration information are larger in the transformation step.

7. The method of image processing according to claim 5, wherein the vibration information is obtained by using the fisheye image data in the vibration detection step.

* * * * *